(12) United States Patent
Huang et al.

(10) Patent No.: US 10,417,526 B2
(45) Date of Patent: Sep. 17, 2019

(54) OBJECT RECOGNITION METHOD AND DEVICE

(71) Applicant: Shenzhen University, Shenzhen, Guangdong Province (CN)

(72) Inventors: Hui Huang, Shenzhen (CN); Kai Xu, Shenzhen (CN); Junyu Zhang, Shenzhen (CN)

(73) Assignee: Shenzhen University, Shenzhen (CN)

( * ) Notice: Subject to any disclaimer, the term of this patent is extended or adjusted under 35 U.S.C. 154(b) by 159 days.

(21) Appl. No.: 15/627,719

(22) Filed: Jun. 20, 2017

(65) Prior Publication Data
US 2018/0165547 A1 Jun. 14, 2018

(30) Foreign Application Priority Data
Dec. 8, 2016 (CN) .......................... 2016 1 1122841

(51) Int. Cl.
*G06K 9/00* (2006.01)
*G06K 9/62* (2006.01)
(Continued)

(52) U.S. Cl.
CPC ......... *G06K 9/6256* (2013.01); *G06K 9/6232* (2013.01); *G06K 9/6269* (2013.01);
(Continued)

(58) Field of Classification Search
CPC .. G06K 9/6256; G06K 9/6232; G06K 9/6269; G06N 3/0454; G06N 3/0445;
(Continued)

(56) References Cited

U.S. PATENT DOCUMENTS 7,421,097 B2 * 9/2008 Hamza ............... G06K 9/00288
235/382
7,587,064 B2 * 9/2009 Owechko ............... G06K 9/469
382/103
(Continued)

FOREIGN PATENT DOCUMENTS

CN 104036242 A 9/2014
CN 105930382 A 9/2016

OTHER PUBLICATIONS

Kai Xu et al.; "3D Attention-Driven Depth Acquisition for Object Identification"; ACM Transactions on Graphics; V 35, Issue 6, Article 238; Nov. 2016.
(Continued)

*Primary Examiner* — Sheela C Chawan
(74) *Attorney, Agent, or Firm* — Harness, Dickey & Pierce, P.L.C.

(57) ABSTRACT

This inventor provides a kind of recognition method and device, including the following stages: S1: get the first feature vector by putting the depth image of current best view of the object to be recognized to feature extractor; S2: get the output of pooling layer by putting the first feature vector to first hidden layer, then get the classification by putting the output of pooling layer to a hierarchical classifier; S3: generate the partial region of current view according to the output of pooling payer and view observation vector; S4: get the second feature vector by putting the partial region to second hidden layer, and the second feature vector includes the output of pooling layer and information of current view; S5: generate the next best view using a fully connected layer and the second feature vector; S6: repeat S1 to S5 until reach the leaf node of the hierarchical classifier. This inventor scans and recognizes the unknown scene, while solving the problem of next best view.

11 Claims, 6 Drawing Sheets

(51) Int. Cl.
*G06T 17/05* (2011.01)
*G06T 15/20* (2011.01)
*G06N 3/08* (2006.01)
*G06T 7/55* (2017.01)
*G06N 3/04* (2006.01)
*G01B 11/22* (2006.01)

(52) U.S. Cl.
CPC ......... *G06N 3/0445* (2013.01); *G06N 3/0454* (2013.01); *G06N 3/08* (2013.01); *G06T 7/55* (2017.01); *G06T 15/205* (2013.01); *G06T 17/05* (2013.01); *G01B 11/22* (2013.01)

(58) Field of Classification Search
CPC ......... G06N 3/08; G06T 15/205; G06T 17/05; G06T 7/55; G01B 11/22
USPC ....... 382/100, 103, 128, 155, 156, 159, 181, 382/224
See application file for complete search history.

(56) References Cited

U.S. PATENT DOCUMENTS

| | | | | |
|---|---|---|---|---|
| 7,860,317 | B2* | 12/2010 | Xie | G06F 16/5854 |
| | | | | 382/195 |
| 8,422,797 | B2* | 4/2013 | Heisele | G06K 9/00208 |
| | | | | 382/159 |
| 8,430,311 | B2* | 4/2013 | Ostrowski | A47F 11/10 |
| | | | | 235/383 |
| 9,367,756 | B2* | 6/2016 | Pillai | G06K 9/00288 |
| 9,940,539 | B2* | 4/2018 | Han | G06K 9/6272 |
| 2018/0063163 | A1* | 3/2018 | Pevny | H04L 63/1425 |
| 2018/0150684 | A1* | 5/2018 | Wang | G06T 7/11 |

OTHER PUBLICATIONS

SIPO Office Action from corresponding application citing the above art; dated Mar. 12, 2019.

* cited by examiner

OBJECT RECOGNITION METHOD AND DEVICE

CROSS REFERENCE TO RELATED APPLICATIONS

The present invention claims priority of CN Application No. 201611122841.5, filed on Dec. 8, 2016, and the entirety of which is incorporated by reference herein.

FIELD OF THE INVENTION

The present invention relates to technologies of 3D modeling, and particularly, a kind of object recognition method and device.

BACKGROUND OF THE INVENTION

Currently robot-based object recognition and manipulation of indoor scene are based on vision method. But as the fast development of 3D sensing techniques and 3D model database, the autonomously robot recognition system is developing explosively. While 3D model is playing more and more important role on machine vision.

Normally, for a coarse object recognition such as desk and chair, only one view point is enough. But in huge 3D model database, fine-grained object recognition is challenging. In this case, one viewing point is not enough.

For the procedure of effective autonomous robot-based recognition, computing a sequence of viewing points is very critical. We call the problem as next-best-view, NBV for short. NBV estimation and object classification are inseparable, the aim is to minimize the uncertainty of classification while minimize the energy of viewing. Fine-grained object recognition need to classify the object and compute the NBV. One straight forward method is train an instance level classifier for the whole database. However fine-grained classification method doesn't work well when the types are too many. So the static information prediction method based on all concerted views and the order of computing views need extra work.

To solve the problems above, existing technology usually use volume to present the 3D model, and train a Convolutional Deep Belief Network (CDBN for short) to model the information of space and used for classifier. By sampling for the distribution, can complete the shape using depth image, while estimate the information gain by virtual scanning. But the method could not predict the NBV, and the method uses volume presentation to classify the shape while could not solve the classification of different fineness.

SUMMARY OF THE INVENTION

The embodiments of the present invention provide an object recognition method and device, while solving the problem of next-best-view planning.

In order to achieve the above object, the embodiments of the present invention provide an object recognition method and device, comprising:

S1: getting a first feature vector by putting the depth image of current best view of the object to be recognized to feature extractor;

S2: getting the output of pooling layer by putting the first feature vector to first hidden layer, then get the classification by putting the output of pooling layer to a hierarchical classifier;

S3: generating the partial region of current view according to the output of pooling payer and view observation vector;

S4: getting a second feature vector by putting the partial region to second hidden layer, and the second feature vector includes the output of pooling layer and information of current view;

S5: generating a next best view using a fully connected layer and the second feature vector;

S6: repeating S1 to S5 until reach the leaf node of the hierarchical classifier.

In one embodiment, the first hidden layer is max pooling layer, which is used for information integration of every viewing points.

In one embodiment, the object recognition method comprising:

encoding the viewing parameters to vector by non-linear function.

In one embodiment, the object recognition method comprising:

clustering the shapes by Gaussian Mixture Model for every non-root node;

training a hierarchical classifier based on the result of clustering result.

In one embodiment, if the depth image is sheltered, further comprising:

extracting a series of parts of the depth image, train a part level neural network at every node of the hierarchical classifier.

In order to achieve the above object, the embodiments of the present invention further provide a recognition device, further comprising:

a feature extraction unit for extracting the first feature vector by putting the depth image of current best view of the object to be recognized to feature extractor;

a classifier unit for putting the first feature vector to first hidden layer to get the result of pooling layer, then put the result of the pooling layer to a hierarchical classifier to get the classification result;

a region generation unit for generating the current focus partial region according to the result of the pooling layer and viewing parameters;

a vector generation unit for putting the partial region to second hidden layer to get the second feature vector, where the second feature vector contains the result of the pooling layer and the information of current partial view;

a next-best-view generation unit for generating the next best view using a fully connected layer and the second feature vector.

In one embodiment, the first hidden layer is max pooling layer, which is used for information integration of every viewing points.

In one embodiment, the object recognition device, comprising: an encoding unit for encoding the viewing parameter to vector by passing through non-linear function.

In one embodiment, the object recognition device, further comprising:

a clustering unit for clustering the shapes at every non-root node by Gaussian Mixture Model;

a classification unit for training the hierarchical classifier using the result of clustering.

In one embodiment, the object recognition device, further comprising:

a sheltering fault-tolerant unit for extracting a series of partial images to train a partial level recurrent neural network at every node.

This invention scans and recognizes a unknown scene, solving the problem of object recognition and next-best-view planning, while fault-tolerant for sheltering which solves the problem of sheltering.

BRIEF DESCRIPTION OF THE DRAWINGS

In order to describe the embodiment of the invention or technical solutions in prior art more clearly, hereinafter accompanying figures required to be used in description of the embodiment or the prior art will be introduced briefly. Obviously, the accompanying figures in the following description are merely some embodiments of the invention, and it is practicable for those skilled in the art to obtain other accompanying figures according to these ones in the premise of making no creative efforts.

DETAILED DESCRIPTION OF THE PREFERRED EMBODIMENTS

Hereinafter the technical solution in the embodiments of the present invention will be described clearly and integrally in combination with the accompanying drawings in the embodiments of the present invention, and obviously the described embodiments are merely part of the embodiments, not all of the embodiments. On the basis of the embodiment in the invention, all of the other embodiments obtained by those skilled in the art in the premise that no creative efforts are made fall within the protection scope of the invention.

There are a lot of applications of autonomous scene reconstruction, such as object manipulation based on robot, virtual reality and augmented reality. This invention accomplished online scene reconstruction using depth image and the method of date-driven based on 3D sensing technology and 3D model database. Given a series of depth image (such as 2.5D depth image), main work is: extract the potential object, then find the most similar model from the 3D database for scene reconstruction. In the process of recognition, robot needs to be guided by the next-best-view.

Figure 1:
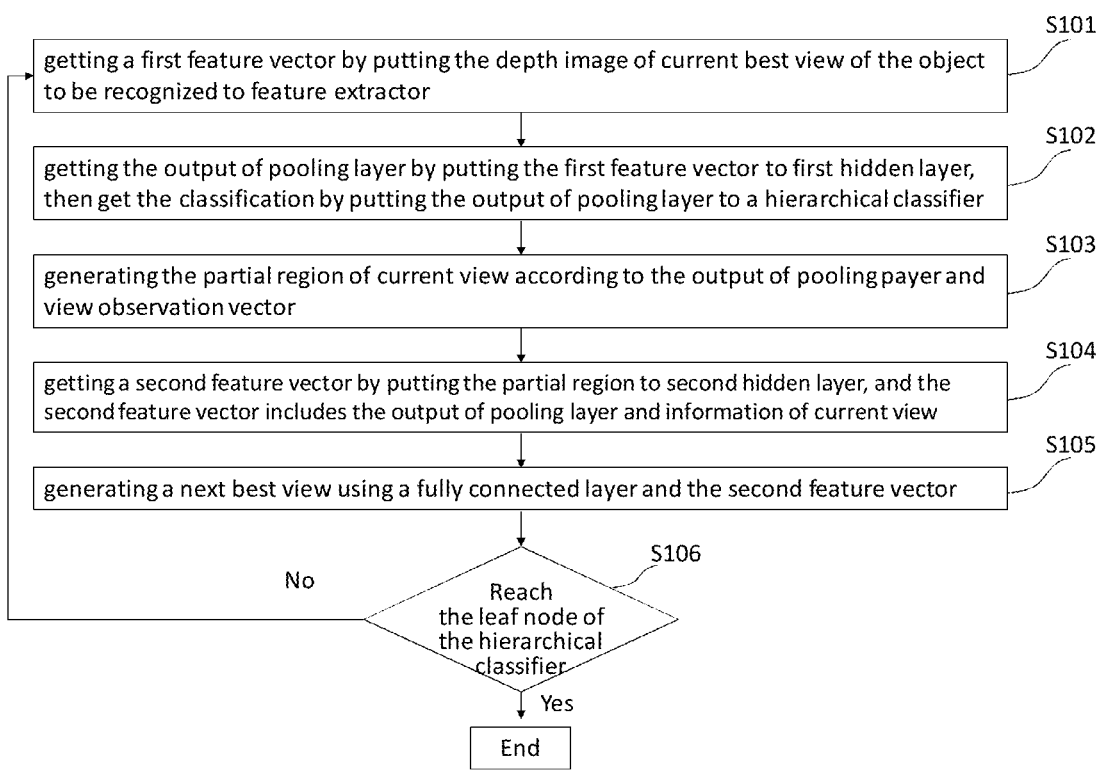
FIG. 1 is a flowchart of object recognition method in an embodiment of the present invention.

FIG. 1 is a flowchart of object recognition method in an embodiment of the present invention. As illustrated in FIG. 1, the method of object recognition comprises:

S101: getting a first feature vector by putting the depth image of current best view of the object to be recognized to feature extractor;

S102: getting the output of pooling layer by putting the first feature vector to first hidden layer, then get the classification by putting the output of pooling layer to a hierarchical classifier;

S103: generating the partial region of current view according to the output of pooling payer and view observation vector;

S104: getting a second feature vector by putting the partial region to second hidden layer, and the second feature vector includes the output of pooling layer and information of current view;

S105: generating a next best view using a fully connected layer and second feature vector;

S106: repeat S101 to S105 until reach the leaf node of the hierarchical classifier.

As can be seen from the flow of FIG. 1, this invention firstly extract feature form depth image of unknown scene, then integrates information of every views by the first hidden layer and get the classification result by the hierarchical classifier, then generates the current focus partial region based on the result of pooling layer and viewing points parameters, then get the second feature vector by the second hidden layer, lastly generates the next-best-view using a fully connected layer and the second feature vector. By scanning and reconstructing the unknown scene, not only solve the problem of object recognition, but also the problem of next-best-view planning.

Figure 2:
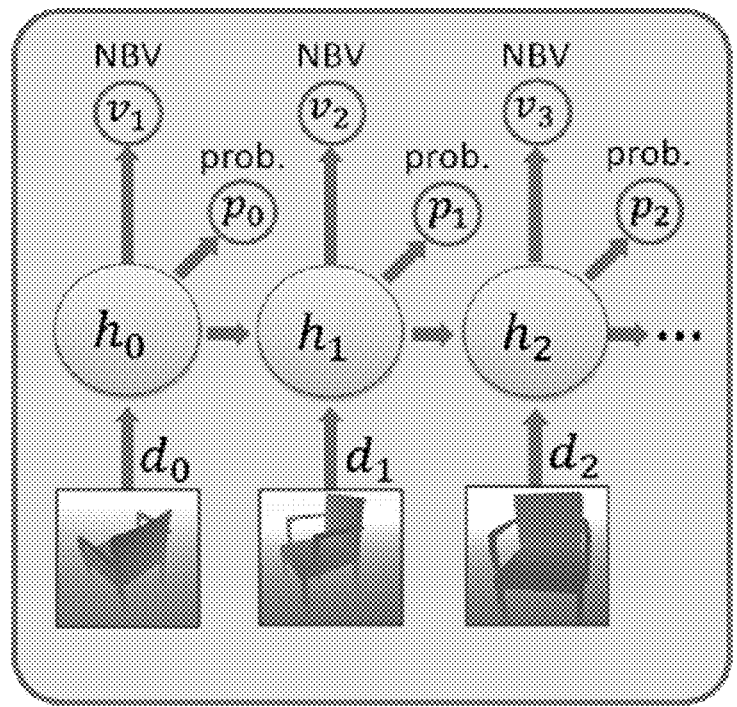
FIG. 2 is a schematic diagram of 3D reinforce model in an embodiment of the present invention.

To achieve 3D object recognition, this invention provides recurrent 3D reinforce model, which accomplished not only instance level object classification but also regression of NBV sequence, as shown in FIG. 2. At every step of 3D reinforce model (for every step in FIG. 3), robot capture a depth image using hand-holding camera, integrates the information of this depth image and the past all depth images (such as integration of depth image in figure and depth image d0 and d1), and update the inner state of 3D reinforce model. This invention transplant Multi-view Convolutional Neural Network (MV-CNN for short) to this invention to get Multi-view Recurrent Neural Network (MV-RNN for short) based on view integration and multi-view convolutional neural network, making it more effective in training and inferring. MV-RNN is shown as FIG. 3.

Figure 3:
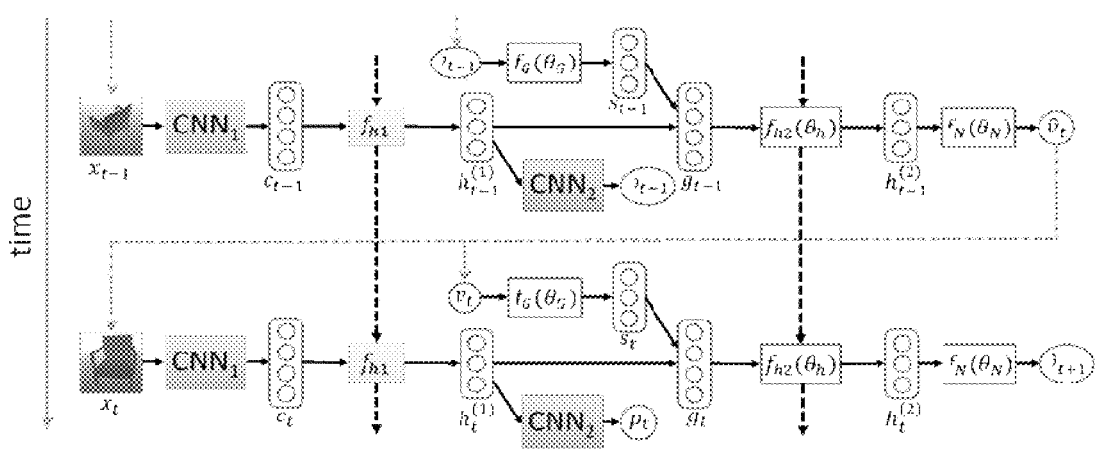
FIG. 3 is a schematic diagram of MV-RNN in an embodiment of the present invention.

The hierarchical classifier is shown in FIG. 3 as CNN2. In order to get the classification result by the hierarchical classifier, this invention needs to train the hierarchical classifier firstly. In one embodiment, clustering the shapes using Gaussian Mixture Model for every non-root node, and then training the hierarchical classifier based on the result of training.

The root node contains all the shapes of the database (database could use ShapeNet), for the root node is the coarsest classifier and needs to classify the shapes. Electively, this invention choose MV-CNN. For every node, this invention train an enhanced MV-NN based on all the relating shapes. For the more fine-grained classifier is relaxing, a shape could be classified to multiple classes. Once a node containing less than 50 shapes could be leaf node.

Specifically, when training the hierarchical classifier, for every non-root node, cluster the current shapes into k overlapping groups. This invention uses Gaussian Mixture Model to cluster the shapes, and estimate the probability of classification once the probability is higher than threshold. Notice, for the cluster is relaxing, one shape can be classify to multi classes.

For the steps of classification, this invention train a relaxing classifier based on the result of clustering. Such as train (k+1) classes, in which one is empty class representing overlapping region. Once one shape is classified to k-th class, it will be labeled and used for training. For the training data is enhanced, the feature are more effective when training.

Figure 4:
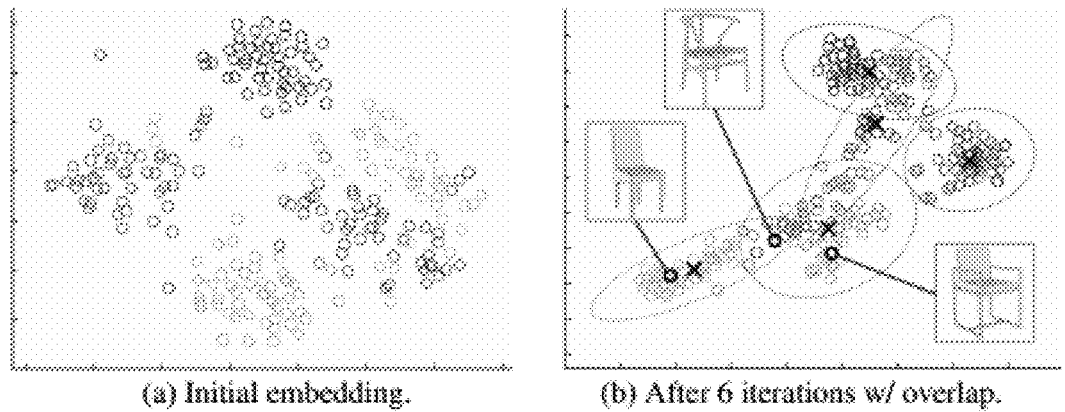
FIG. 4 is a schematic diagram of clustering and classification and sheltering situations in an embodiment of the present invention.

Repeat the process of clustering and classification until the result of clustering is stable. Once one shape belongs to none, this invention uses Gaussian Mixture Model to classify it as FIG. 4 shows the overlapping of clustering and classification. FIG. 4a is the initial state which the 280 chairs belong to 8 classes. FIG. 4b is the result of 6 times iteration.

As illustrated in FIG. 3, input a depth image to feature extractor $CNN_1$ with sharing weights, output a feature map, which is the first feather vector, correspondent to $C_{t-1}$ in FIG. 1. Get the result of information integration of views by put the feather map to first hidden layer $f_{h1}$, then input to trained the hierarchical classifier CNN2. The first hidden layer $f_{h1}$ is view pooling, where max pooling is better.

The key of this invention is feature extraction and feature integration by insert a view pooling layer between feature extractor CNN1 and classifier CNN2. The depth image of view is sent to multi view channel, where each channel shares weights. The multi view feature map integrates information by max pooling and then classify by the second hidden layer $h_2$ ($\theta_h$). Thins invention treat the pre-trained MV-CNN as a sub-network into the 3D reinforce model.

Figure 5:
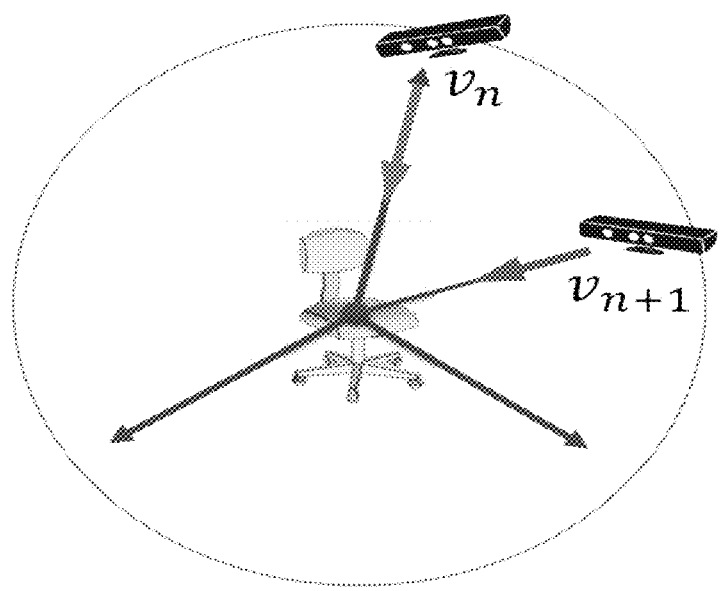
FIG. 5 is a schematic diagram of instance level NBV training in an embodiment of the present invention.

To accomplish continuous nest-best-view planning (i.e. get the next best view NBV), this invention parameterizes the viewing space into a sphere. For a given view, render a depth image as input, where transfer next-best-view estimation into viewing point regression based on viewing parameters. The NBV estimator $v_t$ will predict the parameter of next-best-view with a series of past viewing points as input. Electively, the next-best-view can be parameterized to spherical coordinates, as illustrated in FIG. 5, where $v_0$ is the initial viewing point and $v_{n+1}$ is the next-best-view.

Now we will describe the MV-RNN as illustrated in FIG. 3 in more detailed. This invention uses Recurrent Neural Network (RNN) to get the reinforce model based on views. RNN can be treated as a discrete time system where every time step (a line in FIG. 3) process a depth image $x_{t-1}$ while integrating the past viewing information and generating the next-best-view.

In order to design the 3D reinforce model, this invention uses MV-CNN as object recognition and 3D Recurrent Attention Model (MV-RNN for short), as illustrated in FIG. 3. This invention is consists of some sub-networks.

1) View Aggregation Network

Given a depth image, extract feature map by CNN1 and integrates the information of all the past views by view pooling layer. The view pooling layer stores all the feature maps of the views.

2) View Glimpse Network

This network integrates the information of the viewing aggregation network and the information of last view, output a feature vector, where view parameter $v_{t-1}$ is encoded into a feature vector by a non-linear function $f_g(\theta_g)$. The last glimpse vector $g_t$ is multiplied by the output of view aggregation network $h_{t-1}^{(1)}$ and parameter of glimpse view: $g_{t-1} = h_{t-1}^{(1)} \times s_{t-1}$.

3) Glimpse Aggregation Network

To aggregates all the past viewing information, we use the second hidden layer $f_{h2}(\theta_h)$, containing the information of the first hidden layer ($f_{h1}$) and the current partial information.

4) NBV Regression Network

To get the next-best-view, this sub-network uses the output $h_{t-1}^2$ of glimpse aggregation network as input and generates a NBV parameter vector $v_t$. A fully connected layer $f_v(\theta_v)$ connects the second hidden layer $f_{h2}(\theta_h)$ and parameters $v_t$ of view.

5) Classification Network

At every time step, this invention wants to classify right after integration of viewing information, instead of after glimpse aggregation network, because it's enough for classification after viewing information integration. This invention puts $CNN_2$ after the first hidden layer and get a probability vector of classification $h_{t-1}^{(1)}$, which presenting the probability of classification. $CNN_2$ is independent to MV-RNN and is pre-trained.

If the depth image if sheltered, it need to accomplish fault-tolerant by extracting a series of partial image and train a partial level CNN at every node of the hierarchical classifier. For a given view, if it is sheltered, the key is to recognize the most significant part which is used for object recognition. The basic idea of this invention is to train a part level CNN, then train a part-level CNN at each node of the hierarchical classifier which is illustrated in FIG. 8A to FIG. 8C.

It is accomplished by the following two steps:

1. Focus Extraction

Figure 8A:
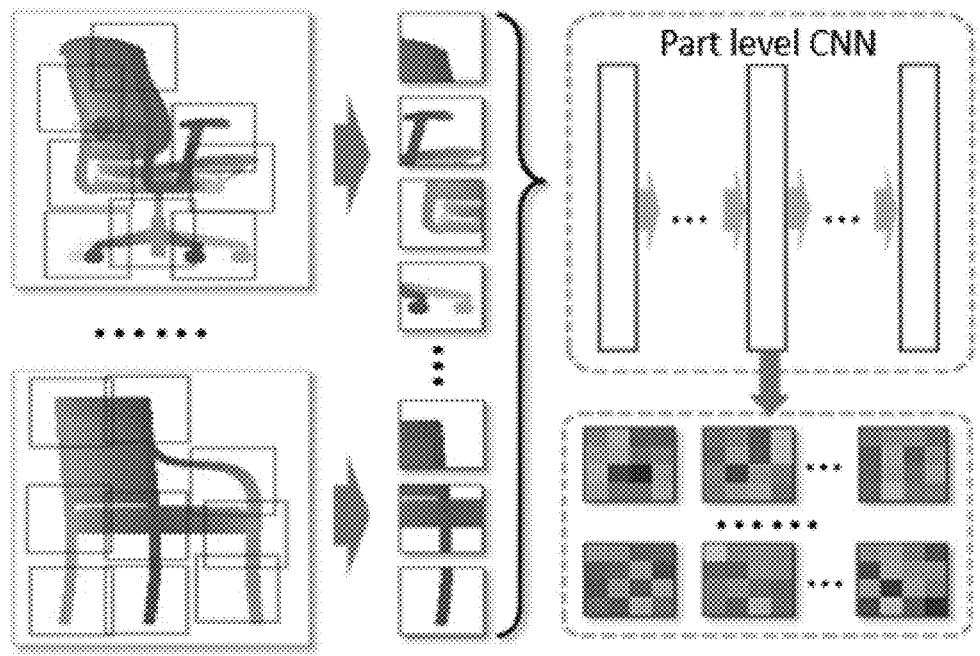
FIG. 8A to FIG. 8C is a schematic diagram of focus-driven feature encoding in an embodiment of the present invention.
Figure 8B:
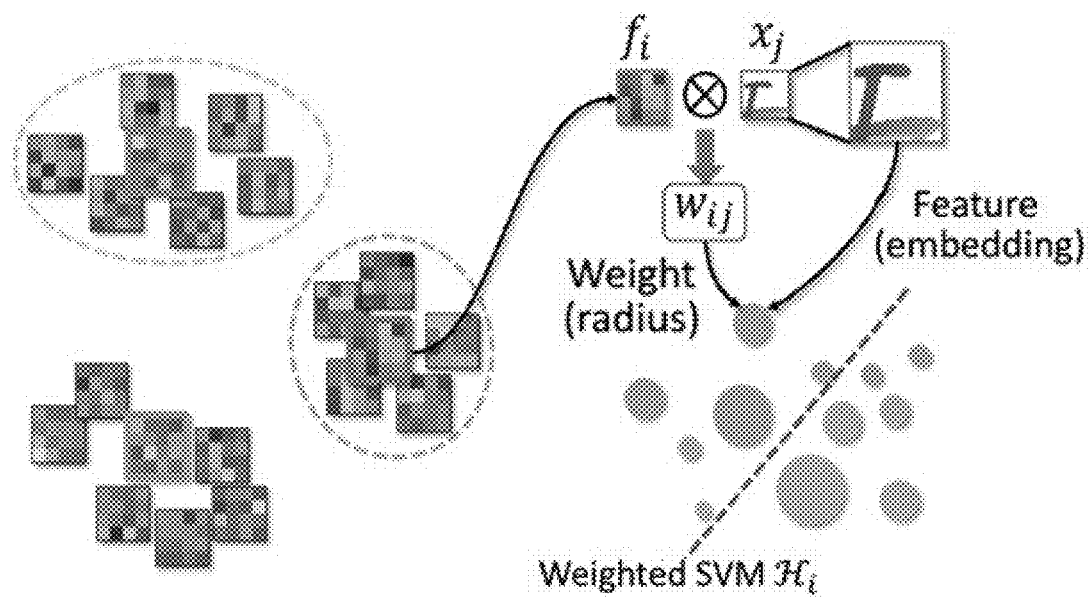
Figure 8C:
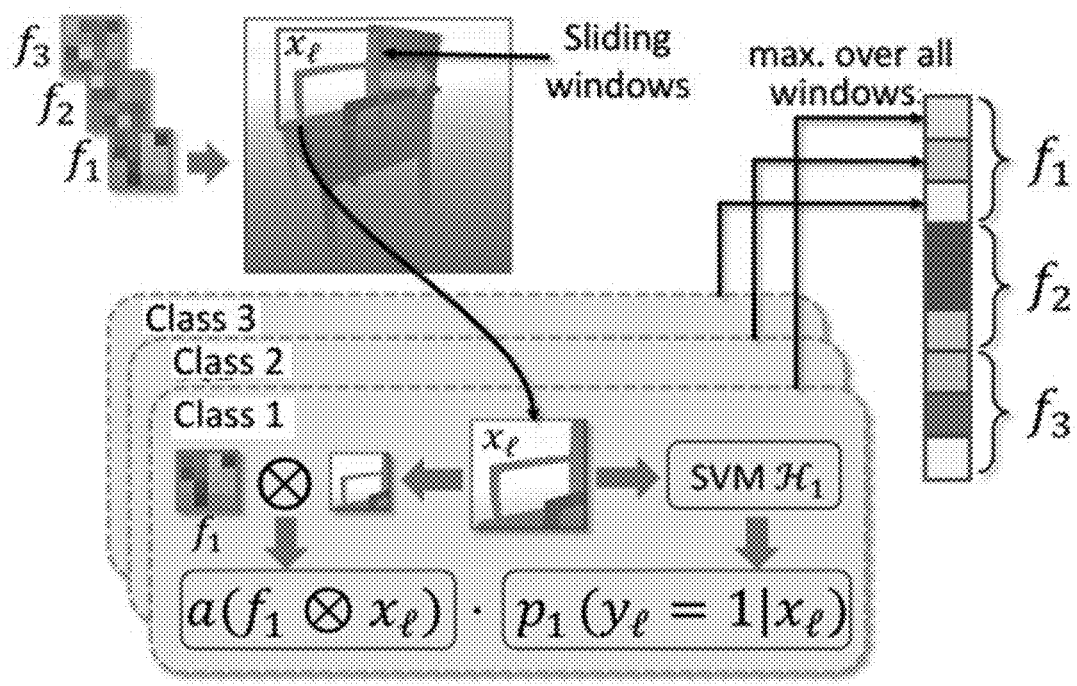

For every node, this invention extracts depth image of all the sample points and extracts some partial regions for every depth image which is used to train a part level CNN as FIG. 8A shown. An empirical observation on this part-level CNN is that neurons of its hidden layer exhibit strong grouping pattern. Inspired by this, we extract the learned convolutional filters from a middle convolutional layer, and cluster them using self-tuning spectral clustering as FIG. 8B shown.

2. Focus-Driven Feature Encoding

For part discerning and part-based discrimination, this invention wants the information of feature encoding. The former can be achieved by performing sliding-window convolution operations over the input depth image, using the learned focus filters. Parts which are relevant to the focus filters will receive high activations. A part-based feature can be constructed by concatenating the activation values corresponding to all the filters, after max pooling operations. To endow the feature with discriminating power against the shape classes, we further train a discriminative model for each focus filter and encode the classification information into the feature.

Suppose there are two classes at a given node of the hierarchy. For each focus filter. We train an activation-weighted SVM by minimizing the following weighted loss function:

$$L^w(\sigma_i) := \sum_{j=1}^{n} \omega_{ij} l(y_j, \sigma_i(x_j))$$

Where $\sigma_i$ is the SVM decision function. The weight $\omega_{ij}$ takes the activation of patch $x_j$ by the convolution filter $f_i$. To perform this convolution, the patch needs to be re-scaled into the filter size. The distance between two patches, used by SVM, as illustrated by FIG. 8B. When there are more than two classes, the SVM can be replaced by multiple weighted one-vs-all SVMs plus a soft-max classifier, which produces a probability distribution over all classes.

The final feature combines both filter response and classification prediction. Specifically, given a depth image, we use each focus filter $f_i$ to perform sliding-window operation over it. For each window patch $x_l$, we compute both convolution activation a and classification probability $p_l$. The feature entry corresponding to filter $f_i$ and class k is:

$$u(f_i, k) := \max_l (a(x_l \otimes f_i) \cdot p_l(y_l = k | x_l))$$

Consequently, the feature for a depth image is a K×F dimensional vector for K classes and F focus filters; see FIG. 8C.

This invention is used to enhance the MV-RNN by replacing its CNN1. Contrasting to the features encoding the information of the entire image, our attention-based features focus on many distributed local parts, each of which may contribute to shape characterization while solving sheltering. In practice, we used two levels of patch size in both focus learning and feature encoding, to attain scale-invariance.

The following example illustrates the present invention.

This invention can be integrates to standard online scene construction schedule. Firstly a PR2 robot hold a Kinect v2 scanner and scans a scene coarsely. There are 3 purposes:
1) Accelerate the object excision and background removal
2) Provide a standard of scene reconstruction
3) Support the test of physical constrains The object recognition is totally based on depth image instead of the mode constructed.

This invention firstly scans a scene roughly and pre-process such as plane removal to extract the object form the whole point cloud to segment the prospect. For the focus object, the robot get the depth image continuously and scan. This invention segment the prospect for better recognition. Once the object is recognized, the model of database will replace the object of scene.

Based on the geometry of constructed scene, this invention check whether this next-best-view is candidate. If not return null. Specifically, we test on some reconstructed scenes. It's accomplished by the collision detection software packages in ROS (Robot Operating System). If the accessibility test fails for 10 estimated NBVs consecutively, the recognition halts with a failure.

This invention can judge whether it's successful to recognize. If not, it can predict the next-best-view and guide the robot for a better scan which is effective for object recognition of complex scene. Meanwhile, this invention provides 3D recurrent attention model, which is fault-tolerant to sheltering. If the next-best-view could not be reached, the model will choose the most significant part for recognition. This method could be used to autonomous scene reconstruction and recognition based on robot which not only solve the problem of object recognition but also view planning. Meanwhile, it's fault-tolerant to sheltering, which is significant.

Based on the method of object recognition mentioned above, this invention provide a device of object recognition. For the theory of the device is similar to the method of object recognition, we don't talk more about it.

Figure 6:
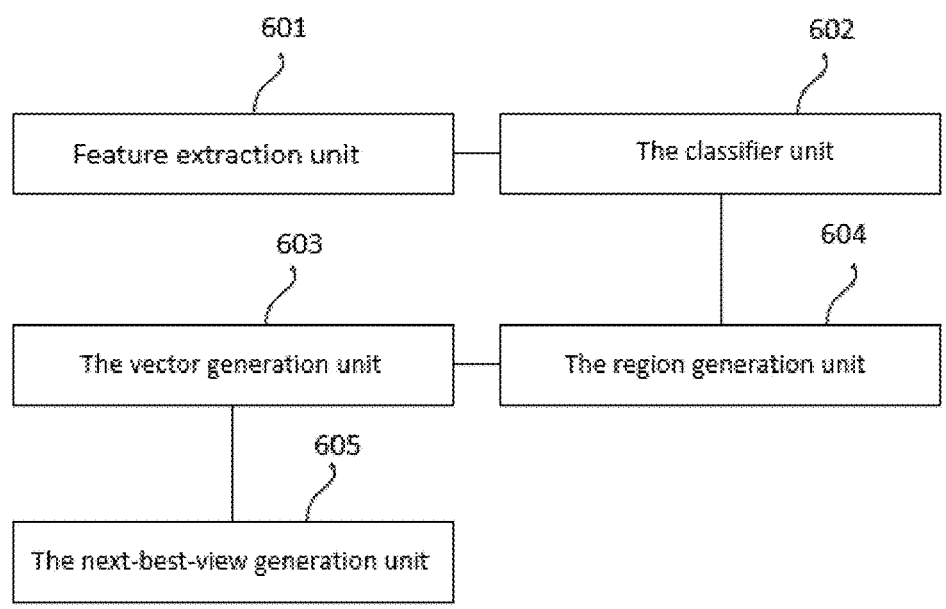
FIG. 6 is a schematic diagram of the structure of object recognition in an embodiment of the present invention.

FIG. 6 is the schematic diagram of the structure of object recognition. As illustrated in FIG. 6, the device of object recognition containing:

The feature extraction unit 601 is used to extract the first feature vector of the depth image of current best view;

The classifier unit 602 puts the first feature vector to first hidden layer to get the result of pooling layer, then put the result of the pooling layer to a hierarchical classifier to get the classification result;

The region generation unit 603 generates the current focus partial region according to the result of the pooling layer and viewing parameters;

The vector generation unit 604 puts the partial region to second hidden layer to get the second feature vector, where the second feature vector contains the result of the pooling layer and the information of current partial view;

The next-best-view generation unit 605, which generates the next best view using a fully connected layer and the second feature vector.

In one embodiment, the first hidden layer is max pooling layer, which is used for information integration of every viewing points.

In one embodiment, the method of object recognition, comprising: the encoding unit encodes the viewing parameter to vector by passing through non-linear function.

In one embodiment, the method of object recognition, further comprising:

The clustering unit clusters the shapes at every non-root node by Gaussian Mixture Model;

The classification unit is used to train the hierarchical classifier using the result of clustering.

In one embodiment, the method of object recognition, further comprising:

Sheltering fault-tolerant unit extracts a series of partial images to train a partial level recurrent neural network at every node.

The embodiment of the invention provides a computer readable storage medium including computer readable instructions, which can be executed by the processor at these steps:

S1: get the first feature vector by putting the depth image of current best view of the object to be recognized to feature extractor;

S2: get the output of pooling layer by putting the first feature vector to first hidden layer, then get the classification by putting the output of pooling layer to a hierarchical classifier;

S3: generate the partial region of current view according to the output of pooling payer and view observation vector;

S4: get the second feature vector by putting the partial region to second hidden layer, and the second feature vector includes the output of pooling layer and information of current view;

S5: generate the next best view using a fully connected layer and second feature vector;

S6: repeat S1 to S5 until reach the leaf node of the hierarchical classifier.

Figure 7:
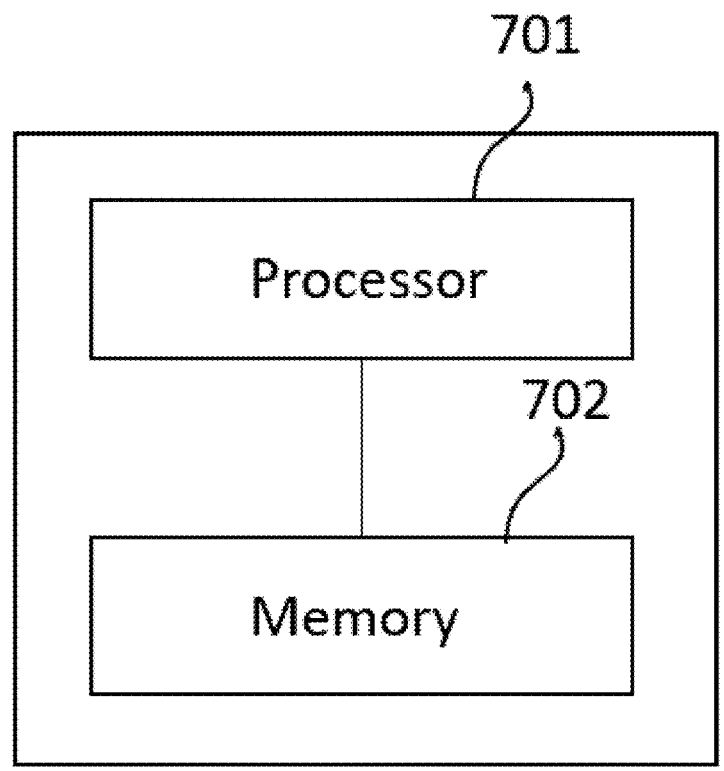
FIG. 7 is a schematic diagram of structure of the device in an embodiment of the present invention.

As illustrated in FIG. 7, this embodiment of invention provide a device, which contains:

Processor 701;

a memory 702 for computer readable instructions, which when being executed, enable the processor to perform the operations of:

S1: get the first feature vector by putting the depth image of current best view of the object to be recognized to feature extractor;

S2: get the output of pooling layer by putting the first feature vector to first hidden layer, then get the classification by putting the output of pooling layer to a hierarchical classifier;

S3: generate the partial region of current view according to the output of pooling payer and view observation vector;

S4: get the second feature vector by putting the partial region to second hidden layer, and the second feature vector includes the output of pooling layer and information of current view;

S5: generate the next best view using a fully connected layer and second feature vector;

S6: repeat S1 to S5 until reach the leaf node of the hierarchical classifier.

Persons skilled in the art shall understand that, the embodiments of the present invention can be provided as a method, a system or a computer program product. Therefore, the present invention can adopt the forms of a full hardware example, a full software example, or combination of a software example and a hardware example. Moreover, the present invention can adopt the form of a computer program product that is implemented on one or more computer-usable storage medium (including but not limited to a disk memory, a CD-ROM, an optical memory, and etc.) including computer-usable program codes.

The invention is described with reference to flow diagrams and/or block diagrams of the method, the device (system) and the computer program product according to the embodiment of the invention. It should be understood that each flow and/or block in the flow diagrams and/or block diagrams, and the combination of the flows and/or blocks in the flow diagrams and/or block diagrams can be achieved by computer program commands. These computer program commands can be provided to a CPU of a general-purpose computer, a special-purpose computer, an embedded processor or other programmable data processing device to produce a machine, so that a device for achieving functions designated in one or more flows in the flow diagrams and/or one or more blocks in the block diagrams can be generated by the command executed by the CPU of the computer or other programmable data processing device.

These computer program commands can also be stored in a computer-readable memory that can guide a computer or other programmable data processing device to operate in a special way, so that the command stored in the computer-readable memory generates a manufactured product including a command device which achieves functions designated in one or more flows in the flow diagrams and/or one or more blocks in the block diagrams.

These computer program commands can also be loaded on a computer or other programmable data processing device, on which a series of operation steps are executed to generate processing achieved by the computer, so that the command executed on the computer or other programmable data processing device is provided for being used in the steps of achieving functions designated in one or more flows in the flow diagrams and/or one or more blocks in the block diagrams.

The invention adopts specific embodiments to explain the principle and implementation way of the invention. The above embodiments are described merely for helping to understand the method and core concept of the invention; in addition, a person skilled in the art can, on the basis of the concept of the invention, make modifications to both of the specific embodiments and application scope. In conclusion, contents disclosed herein should not be understood as limitation to the invention.

The invention claimed is:

1. An object recognition method, comprising:
   S1: getting a first feature vector by putting the depth image of current best view of the object to be recognized to feature extractor;
   S2: getting the output of pooling layer by putting the first feature vector to first hidden layer, then get the classification by putting the output of pooling layer to a hierarchical classifier;
   S3: generating the partial region of current view according to the output of pooling payer and view observation vector;
   S4: getting a second feature vector by putting the partial region to second hidden layer, and the second feature vector includes the output of pooling layer and information of current view;
   S5: generating a next best view using a fully connected layer and the second feature vector;
   S6: repeating S1 to S5 until reach the leaf node of the hierarchical classifier.

2. The object recognition method according to claim 1, comprising: the first hidden layer is max pooling layer, which is used for information integration of views.

3. The object recognition method according to claim 1, comprising: encoding the viewing parameters to vector by non-linear function.

4. The object recognition method according to claim 1, further comprising:
   clustering the shapes using Gaussian Mixture Model for every non-root node;
   training a hierarchical classifier based on the result of cluster.

5. The object recognition method according to claim 1, if the depth image is sheltered, further comprising:
   Extracting a series of parts of the depth image, train a part level neural network at every node of the hierarchical classifier.

6. An object recognition device, comprising:
   A feature extraction unit for extracting the first feature vector by putting the depth image of current best view of the object to be recognized to feature extractor;
   a classifier unit for putting the first feature vector to first hidden layer to get the result of pooling layer, then putting the result of the pooling layer to a hierarchical classifier to get the classification result;
   a region generation unit for generating the current focus partial region according to the result of the pooling layer and viewing parameters;
   a vector generation unit for putting the partial region to second hidden layer to get the second feature vector, where the second feature vector contains the result of the pooling layer and the information of current partial view;
   a next-best-view generation unit for generating the next best view using a fully connected layer and the second feature vector.

7. The object recognition device according to claim 6, comprising: the first hidden layer is pooling layer, which is used to integrate the information of every view.

8. The object recognition device according to claim 6, further comprising: an encoding unit for encoding the viewing parameter to vector by passing through non-linear function.

9. The object recognition device according to claim 6, further comprising:
   a clustering unit for clustering the shapes at every non-root node by Gaussian Mixture Model;
   a classification unit for training the hierarchical classifier using the result of clustering.

10. The object recognition device according to claim 6, further comprising:
    a sheltering fault-tolerant unit for extracting a series of partial images to train a partial level recurrent neural network at every node.

11. A device, comprising:
    a processor; and
    a memory for computer readable instructions, which when being executed, enable the processor to perform the operations of:
    S1: getting a first feature vector by putting the depth image of current best view of the object to be recognized to feature extractor;

S2: getting the output of pooling layer by putting the first feature vector to first hidden layer, then get the classification by putting the output of pooling layer to a hierarchical classifier;

S3: generating the partial region of current view according to the output of pooling payer and view observation vector;

S4: getting a second feature vector by putting the partial region to second hidden layer, and the second feature vector includes the output of pooling layer and information of current view;

S5: generating a next best view using a fully connected layer and the second feature vector;

S6: repeating S1 to S5 until reach the leaf node of the hierarchical classifier.

* * * * *